United States Patent Office 2,711,824
Patented June 28, 1955

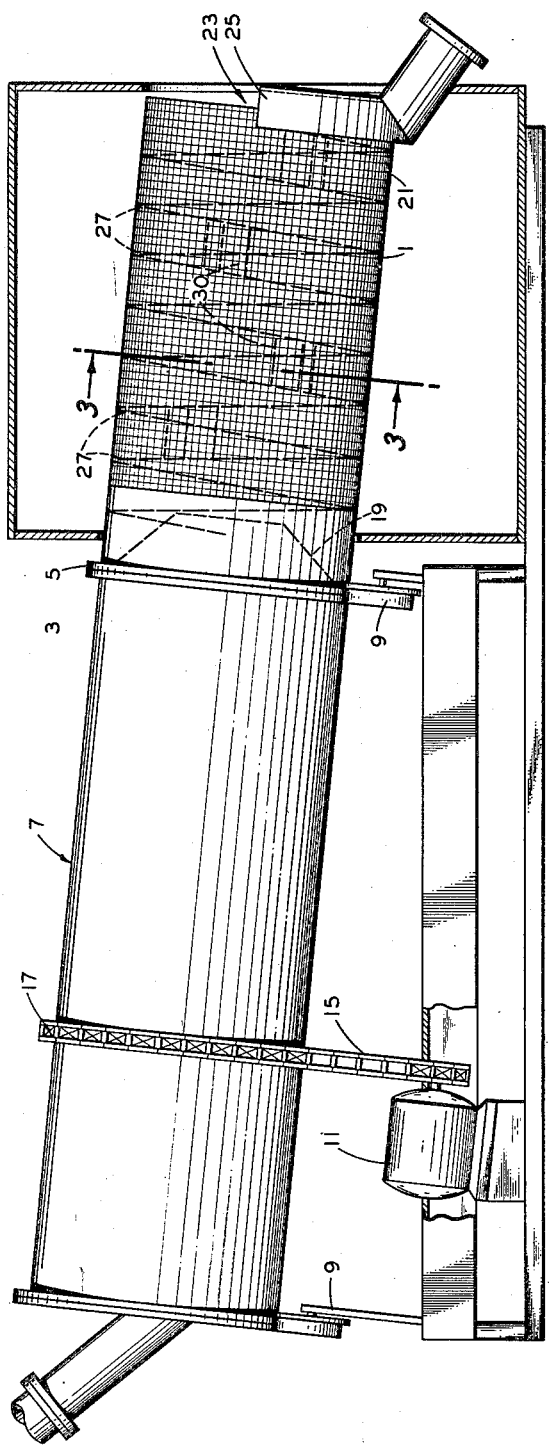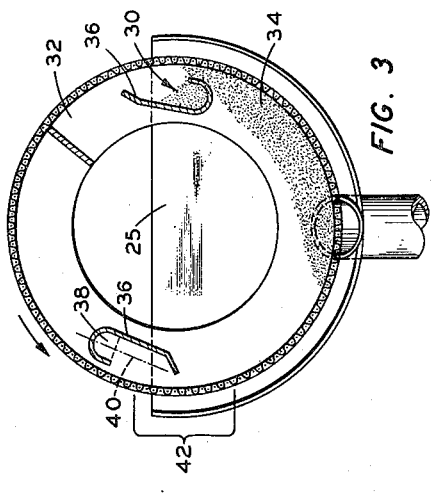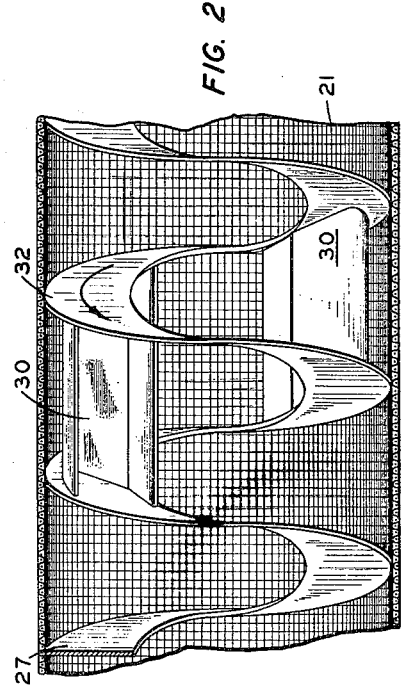

2,711,824

TUMBLER-SCREENER

John W. Ehrler, Cactus, Tex., assignor to Phillips Petroleum Company, a corporation of Delaware Application September 13, 1951, Serial No. 246,414

2 Claims. (Cl. 209—298)

This invention relates to screens for classifying particles. In a more particular aspect this invention relates to cylindrical tumbler-screeners for classifying particles.

In the manfacture of fertilizers such as ammonium nitrate and ammonium sulfate, gas is usually passed through nitric acid or sulfuric acid and the resulting solution is evaporated. However, because of its hygroscopic nature ammonium nitrate, or ammonium sulfate, cannot be used for the dry mixing of fertilizers or easily handled. Hence considerable study has been carried out to find out how to coat ammonium nitrate, and ammonium sulfate, granules to retard or prevent its hygroscopic tendencies. As a result the fertilizer particles are coated with resins, paraffin, or clay.

In the prilling process for ammonium nitrate, the prills formed in the prilling tower are dried and cooled in horizontal drum type dryers. The dried product is classified on a vibrated screen through which air is passed to remove fines. The classified prills and diatomaceous earth in proper proportions are then tumbled in a tumbler to coat the prills with the diatomaceous earth. At the exit end of the tumbler the prills pass across a revolving cylindrical screen in a draft of air to classify the coated product. In practice the product tends to pile up on one side of the screen so that only about twenty per cent of the screen surface is utilized.

It is an object of this invention to provide an improved cylindrical screen for classifying particles. Another object of this invention is to provide an improved tumbler-screener for attachment to fertilizer coating tumblers. A further object of this invention is to provide a means for increasing the surface or inner circumference of a tumbler-screener which is effective in screening the product. A still further object is to provide a tumbler-screener distributor adapted to minimize breakage of fertilizer prills. Other objects and advantages of this invention will become apparent, to one skilled in the art, from the accompanying disclosure and discussion.

The tumbler-screener which is the subject of this invention is a cylindrical screen having an inlet end adapted to be secured to a tumbler, an outlet in the end opposite the tumbler for the removal of oversized particles, a helicoid coaxially disposed within said cylindrical screen and attached at its periphery to the inner wall of said screen, a series of lifting chambers disposed between the whorls of said helicoid, said lifting chambers being positioned to pick up at least half of the product from the occupied inner surface of the screen and adapted to deposit said product on an unoccupied surface of said screen.

In order more clearly to describe the present invention reference will be made to the accompanying drawings.

Figure 1 is a side view of a tumbler-screener showing the tumbler and the attached tumbler-screener of the instant invention.

Figure 2 is a side view of the tumbler-screener having the screen cut away to show a desired type of lifting chamber.

Figure 3 is a cross sectional view taken along a plane indicated by line 3—3 in Figure 1 showing type of preferred lifting chamber and its position relative to the product bed.

Referring now to Figure 1, which is a tumbler and a tumbler-screener of a type contemplated herein, a tumbler-screener 1 is attached at its inlet end 3 by any suitable means such as flange 5 to a tumbler 7. Tumbler 7 rests on bearings 9, and the tumbler and tumbler-screener 1, attached thereto, are rotated by a driving means such as motor 11, chain 15 and sprocket 17. Incline 19, at the inlet end of tumbler-screener 1 holds the clay in said tumbler at the desired depth for the coating of said fertilizer particles. One element of tumbler-screener 1 is a cylindrical screen 21 of desired mesh, ordinarily ¼ inch mesh, through which prills of the proper size pass. At the outlet end 23 of the tumbler-screener is a reject chute 25, for oversized prills, lumps and small balls of clay. Prills within the proper size range pass through the screen, while fines are blown out by means not shown.

Figure 2 shows tumbler-screener 1 with part of cylindrical screen 21 cut away. Coaxially disposed within cylindrical screen 21 is a helicoid 27, the periphery of which is contiguous to and integrally attached to interior surface of the screen 26. The helicoid has an apparent longitudinal movement along its principal axis toward outlet end 23 of tumbler-screener 1.

It is emphasized that an important element of this invention is the provision for increasing the effective inner circumference of the tumbler-screener. In one embodiment, lifting chambers 30 are disposed between and attached to the whorls or blades 32 of helicoid 27. Lifting chambers 30 are positioned between whorls 32 so that they pick up at least half of the product which piles up usually on one side within the screeners.

Figure 3 is a cross sectional view taken through 3—3 of Figure 1 showing one preferred lifting chamber 30 and its position relative to the product bed 34. The figure also shows another lifting chamber and the zone 42 where most of the fertilizer prills will hit the screen on leaving the lifting chambers. It is noted that lifting chamber 30 has a retainer 36 at its inner or normal pouring edge for holding the particles in the chamber until said chamber is rotated beyond the point where the particles would normally pour out. Lifting chamber 30 shown in Figure 3 is in the form of a scoop. The inner rim 36 between whorls 32 is extended upwardly and inwardly with respect to said scoop to form a retainer 36. The extended rim is preferably of such length that the retainer formed thereby will have a volume about equal to the volume of said scoop. In other words the volume of body portion 38 should be about equal to the volume contained under dotted line 40, in Figure 3. Thus Figure 3 shows the position of the product bed 34, with respect to the position of lifting chamber 30 and at 42, the approximate area where prills when poured out of lifting chamber 30 will hit the screen.

Any number of lifting chambers or other scoops can be disposed between the whorls of the helicoid but I prefer to introduce lifting chambers radially at intervals of about 150 degrees throughout the length of the tumbler-screener. The lifting chambers positioned to pick up product are disposed between the whorls at such a distance from the screen that they dip into the product. The amount of product which is picked up by a lifting chamber is determined by the number of lifting chambers and their distance from the interior surface of the tumbler-screener. Of course the lifting chambers cannot be too close to screen since room must be allowed for oversized particles to pass under chamber and out discharge. Desirably the distance of a lifting chamber from the interior of the screen should be such that about half of the product which accumulates on the screen is picked up, carried in the direction of rotation and finally discharged on an unused surface in a different quadrant of the screen. The retainer on the extended normal pouring edge of the lifting chamber keeps the prills from falling distances so great that the prills are thereby broken.

In operation, as tumbler 7 is rotated prills are discharged from incline 19 into tumbler-screener 1. The helicoid 27 prevents the entire quantity of prills from rapidly cascading across the screen without permitting enough residence time for the desired prills to pass through the screen. In order to prevent over-loading, lifting chambers 30, disposed between whorls 32 of helicoid 27, pick up about half of the prills and carry them to the other side within the cylindrical screen. A retainer 36 on each lifting chamber prevents the prills from falling too far and breaking. The prills fall out of the chambers as they are rotated past the horizontal position. Over-sized prills, lumps and small balls of clay pass over the screen to a reject chute 25 at the outlet end of tumbler-screener 1. Fines are generally removed by a draft of air through the screener.

The tumbler-screener of this invention is being used on a commercial basis in the classification of ammonium nitrate fertilizer prills. Previously, one of the difficulties at the ammonium nitrate plant has been that the tumbler-screener could not handle sufficient product. Investigation has shown that only one-fifth of the screen was in actual use. Lifting chambers were installed in accordance with this invention, and on the basis of 300 tons per day, six lifting chambers will transfer one half of the load to another part of the screen. Ten lifting chambers were installed in the commercially used tumbler screener, and since installation the screener has not overflowed.

The speed of rotation of the tumbler-screener may vary over a wide range. Ordinarily the tumbler-screener will be rotated with, and at the same speed as, the tumbler. However, if the screener is so constructed that it rotates separately from the tumbler, high speeds of rotation should be avoided in order to prevent particles of desired size from breaking or passing through the tumbler-screener to the reject chute.

The pitch of the helicoid is not of extreme importance, except that the use of a helicoid having a short pitch results in longer grading time. In one embodiment the whorls are eight inches apart. Since the helicoid can be conveniently formed from a ribbon of metal about six to eight inches wide it will ordinarily be so constructed that it will have a cylindrical coaxial hollow shaft, or a cylindrical hollow core. However since this shaft serves no particular purpose the helicoid could be constructed without such a hollow core, depending of course upon the size and shape of the lifting chamber.

It is understood that the lifting chambers can be of any shape or size, a larger number being used if the lifting chambers are smaller. The lifting chambers can be integral three dimensional units having four sides, a bottom, and a retaining edge; or they may be J-shaped planes with their sides being formed by the whorls of the helicoid. A lifting chamber can also be a sheet metal element bent at one end to form a hemi-cylindrical bottom integral with a plane back and bent inwardly at the other end to form a lip.

Obviously many modifications or variations will occur to one skilled in the art and may be made without departing from the spirit and scope of the invention.

I claim:

1. A tumbler-screener for classifying coated particles which comprises a cylindrical screen having an inlet end adapted to be secured to a tumbler and an outlet in the end opposite the tumbler for the removal of oversized particles, a helicoid coaxially disposed within said cylindrical screen and attached at its periphery to the inner wall of said screen, and a series of scoops of generally J-shaped cross section disposed between and attached to the whorls of said helicoid with the portion corresponding to the shank of the J disposed generally parallel to a tangent to the adjacent portion of the wall of said screen with the top of the shank in the direction of rotation of said screen, the hook of the J directed toward but spaced from said adjacent wall and positioned to dip into the top part of the product and pick up about half of the product, thereby permitting the remainder to roll on the screen beneath each scoop, and the outer end of said shank of said J from said hook being inclined to the plane of said shank on the same side of the J as said hook to form a retainer at the normal pouring end of each scoop for holding particles until the scoop is rotated beyond a vertical plane containing the longitudinal axis of said cylindrical screen.

2. A tumbler-screener for classifying coated particles which comprises a cylindrical screen having an inlet end adapted to be secured to a tumbler and an outlet in the end opposite the tumbler for the removal of oversized particles, a helicoid coaxially disposed within said cylindrical screen and attached at its periphery to the inner wall of said screen, said helicoid having a hollow central coaxial core, and a series of scoops of generally J-shaped cross section disposed radially about 150 degrees apart between and attached to the whorls of said helicoid with the portion corresponding to the shank of the J disposed generally parallel to a tangent to the adjacent portion of the wall of said screen with the top of the shank in the direction of rotation of said screen and the hook of the J directed toward but spaced from said adjacent wall, and positioned at a distance from the screen so as to pick up about half of the particles, the outer end of said shank of said J from said hook of each scoop between the whorls being inclined to the plane of said shank on the same side the J as said hook and the sides of said extended shank being attached to said whorls to form a retainer the volume of which, when the shank is in a horizontal position at the top of its rotation, is about equal to the volume of the hook portion of the J when the shank is vertical and rising in its rotation.

References Cited in the file of this patent

UNITED STATES PATENTS

| 143,745 | Bradford | Oct. 21, 1873 |
| 315,523 | Lynett | Apr. 14, 1885 |
| 374,754 | Pring | Dec. 13, 1887 |
| 484,172 | Flammger | Oct. 11, 1929 |

FOREIGN PATENTS

| 48,795 | France | Mar. 18, 1938 |
| 95,207 | Sweden | Mar. 30, 1939 |
| 101,064 | Germany | Jan. 23, 1899 |
| 302,829 | Great Britain | Dec. 27, 1928 |
| 484,172 | Germany | Oct. 11, 1929 |